United States Patent [19]
Yang

[11] Patent Number: 5,612,814
[45] Date of Patent: Mar. 18, 1997

[54] COMPACT SIZED OPTICAL PROJECTION SYSTEM

[75] Inventor: Jin-Se Yang, Seoul, Rep. of Korea

[73] Assignee: Daewoo Electronics Co., Ltd., Seoul, Rep. of Korea

[21] Appl. No.: 518,871

[22] Filed: Aug. 24, 1995

[30] Foreign Application Priority Data

Aug. 24, 1994 [KR] Rep. of Korea ...................... 94-20846
Aug. 24, 1994 [KR] Rep. of Korea ...................... 94-20847

[51] Int. Cl.⁶ .................................................. G02B 26/00
[52] U.S. Cl. ........................... 359/291; 359/212; 359/846; 359/850; 348/771
[58] Field of Search ..................................... 359/212, 213, 359/214, 223, 224, 247, 259, 290, 291, 292, 295, 302, 316, 318, 846, 847, 848, 849, 850, 851, 852, 853, 854, 855, 856, 857; 348/755, 756, 771

[56] References Cited

U.S. PATENT DOCUMENTS

| | | | |
|---|---|---|---|
| 5,192,946 | 3/1993 | Thompson et al. | 340/794 |
| 5,442,414 | 8/1995 | Janssen et al. | 353/98 |
| 5,519,518 | 5/1996 | Watanabe et al. | 359/40 |

*Primary Examiner*—Georgia Y. Epps
*Assistant Examiner*—Dawn-Marie Bey
*Attorney, Agent, or Firm*—Pennie & Edmonds

[57] ABSTRACT

A compact sized optical projection system capable of displaying an image of M×N pixels in various sizes, wherein M and N are integers, includes a light source, a source stopper, a source lens, a total reflection mirror, an array of M×N actuated mirrors, a projection stopper, a projection lens, a projection screen and an array of M×N pixel filters, wherein the array of M×N pixel filters includes a plurality of sets of R pixel filter, G pixel filter and B pixel filter, and each of the sets is repeated both in a horizontal and a vertical directions, and each of the pixel filters is capable of transmitting only one of the primary light beams.

11 Claims, 4 Drawing Sheets

COMPACT SIZED OPTICAL PROJECTION SYSTEM

FIELD OF THE INVENTION

The present invention relates to an optical projection system; and, more particularly, to an optical projection system with a reduced size by incorporating therein an array of M×N pixel filters.

BACKGROUND OF THE INVENTION

Among the various video display systems available in the art, an optical projection system is known to be capable of providing high quality images in a large scale.

In FIG. 1, there is illustrated a prior art optical projection system 100 comprising a light source 10, a source lens 20, a source stopper 22 provided with a light transmitting portion 26 and a light stopping portion 24, a total reflection mirror 30 including a reflective surface 32, a beam splitting means 40, a trinity of arrays of M×N actuated mirrors 50, a first, a second and a third arrays 52, 54, 56 of M×N actuated mirrors 50, a trinity of field lenses including a first, a second and a third field lenses 60, 62, 64, a projection stopper 70 provided with a light transmitting portion 74 and a light stopping portion 72, a projection lens 80 and a projection screen 90.

In such a system, a white light emanating from the light source 10 is focussed along a first optical light path onto the light transmitting portion 26 on the source stopper 22 by the source lens 20 located between the light source 10 and the source stopper 22, wherein the white light consists of a first, a second and a third primary colors. The source stopper 22 is used for shaping the white light from the light source 10 via the source lens 20 into a predetermined configuration by allowing a specific portion of the white light to pass through the light transmitting portion 26 thereof. The white light from the source stopper 22 travels onto the reflective surfaces 32 of the total reflection mirror 30 in a facing relationship with the source stopper 22 and the beam splitting means 40. The white light reflected from the reflective surface 32 of the total reflection mirror 30 travels along a second optical path, and is uniformly illuminated onto the beam splitting means 40 including the first and second dichroic mirrors 42, 44. The first dichroic mirror 42 disposed between the total reflection mirror 30 and the second dichroic mirror 44 facing the first array 52 of M×N actuated mirror 50, receives the white light from the reflective surface 32 of the total reflection mirror 30, isolates and reflects the first primary light beam of the white light to the first array 52 of the M×N actuated mirrors 50, and transmits the second and third primary light beams to the second dichroic mirror 44. The second dichroic mirror 44 disposed between the third array 56 of M×N actuated mirror 50 and the first dichroic mirror 42 facing the first array 52 of M×N actuated mirror 50, upon receiving the second and third primary light beams from the first dichroic mirror 42, isolates and reflects the second primary light beam to the second array 54 of the M×N actuated mirrors 50, and transmits the third primary light beams to the third array 56 of M×N actuated mirrors 50. Each of the actuated mirrors 50 in the array 52, 54, 56 includes a mirror and an actuator made of a piezoelectric material or an electrostrictive material which deforms in response to an electric field applied thereto. Each of the actuated mirrors 50 in the arrays 52, 54, 56 corresponds to each of the pixels to be displayed.

Each of the first, second and third field lenses 60, 62, 64, located between the first dichroic mirror 42 and the first array 52 of M×N actuated mirrors 50, the second dichroic mirror 44 and the second array 54 of M×N actuated mirrors 50, and the second dichroic mirror 44 and the third array 56 of M×N actuated mirrors 50, respectively, is used for collimating each of the primary light beams from each of the dichroic mirrors 42, 44 in the beam splitting means 40 to thereby uniformly illuminate each of the primary light beams onto the corresponding array of M×N actuated mirrors.

The reflected primary light beams from each of the undeflected actuated mirrors in each of the arrays 52, 54, 56 are focussed back to the projection stopper 70 by the corresponding field lens via the beam splitting means 40 through the light transmitting portion 74 of the projection stopper 70, whereas the reflected primary light beams from each of the deflected actuated mirrors in each of the arrays 52, 54, 56 are focussed back to the projection stopper 70 by the corresponding field lens via the total reflection mirror 30 and partially stopped by the light stopping portion 72 of the projection stopper 70 so that a portion of the focussed primary light beams passes through the light transmitting portion 74 to thereby modulate the intensity of the primary light beams. The primary light beams from each of the actuated mirrors 50 in the arrays 52, 54, 56 which pass through the light transmitting portion 74 of the projection stopper 70 located at the focal point of the field lenses 60, 62, 64 are transmitted to the projection lens 80 which, in turn, projects the transmitted primary light beams onto the projection screen 90.

One of the major shortcomings of the above-described optical projection system 100 is the size thereof, arising from the use of the pair of dichroic mirrors 42, 44, which, in turn, necessitates the use of the trinity of arrays 52, 54, 56 of M×N actuated mirrors 50 and the field lenses 60, 62, 64, thereby making the optical projection system 100 bulky and structurally complicated.

SUMMARY OF THE INVENTION

It is, therefore, a primary object of the present invention to provide an optical projection system having a reduced size and of a simpler structure.

In accordance with the present invention, there is provided an optical projection system capable of displaying an image of M×N pixels, wherein M and N are integers, comprising: a light source for emitting a white light, wherein the white light consists of a first, a second and a third primary light beams, each of the primary light beams being one of the primary colors; an array of M×N actuated mirrors for changing an optical path of each of the primary light beams reflected therefrom in response to an electric signal, wherein each of the actuated mirrors includes a pedestal, an actuator cantilevered from the pedestal and a mirror formed on top of the actuator, and the mirror in each of the actuated mirrors has a bending portion and an unbending portion, the unbending portion referring to a portion of the mirror on top of a portion of the actuator directly cantilevered on the pedestal, and each of the actuators is made of a piezoelectric or an electrostrictive material which deforms in response to the electric signal applied thereto; a source stopper, provided with a light transmitting portion having a specific configuration and a light stopping portion and being placed in front of the light source, for shaping the white light from the light source into a predetermined configuration; a source lens, disposed between the source stopper and the light source, for focussing the white light onto the source stopper; an optical means for reflecting the white light from the source stopper to the array of M×N actuated mirrors at a predetermined angle; a field lens located between the optical means and the array of M×N actuated mirrors, wherein the field lens is used for collimating the white light reflected from the optical means onto the array of M×N actuated mirrors and for refocussing each of the primary light beams reflected from each of the actuated mirrors in the array; an array of M×N pixel filters, disposed between the field lens and the array of M×N actuated mirrors, each of the pixel filters being capable of transmitting only one of the primary light beams, wherein each of the primary light beams transmitted through the array of M×N pixel filters impinges onto a corresponding actuated mirror in the array and each of the primary light beams reflected by each of the actuated mirrors impinges onto the field lens through the array of M×N pixel filters to thereby produce a packet of reflected primary light beams; a projection screen being placed in front of the array of M×N actuated mirrors for displaying an image made of the M×N number of pixels thereon; a projection stopper located between the optical means and the projection screen, provided with a light transmitting portion and a light stopping portion for passing a predetermined amount from the packet of reflected primary light beams refocussed by the field lens to thereby produce a packet of modulated primary light beams; and a projection lens for projecting the packet of modulated primary light beams from the projection stopper onto the projection screen.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1:
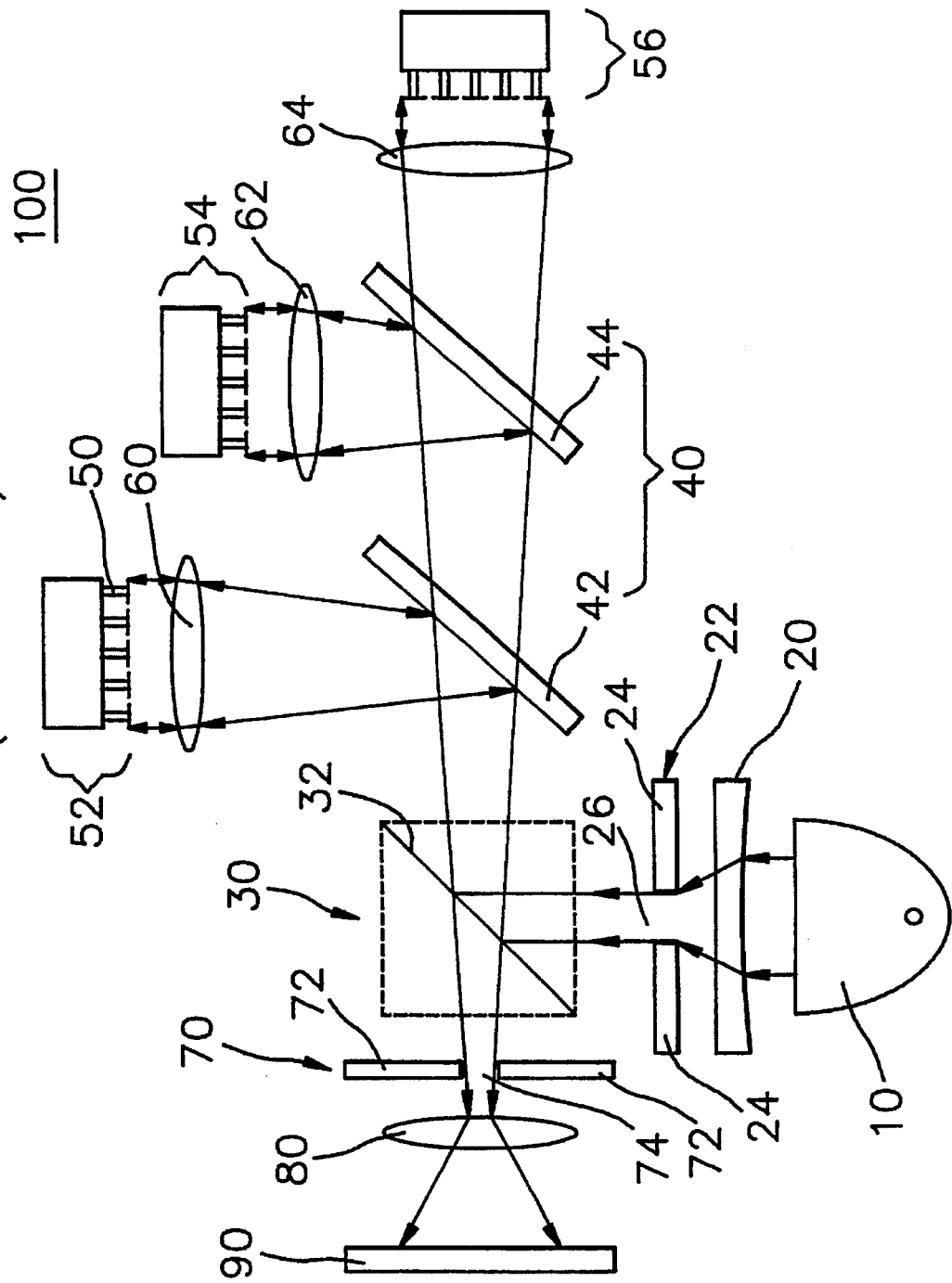
FIG. 1 represents a schematic view of a prior art optical projection system.
Figure 2:
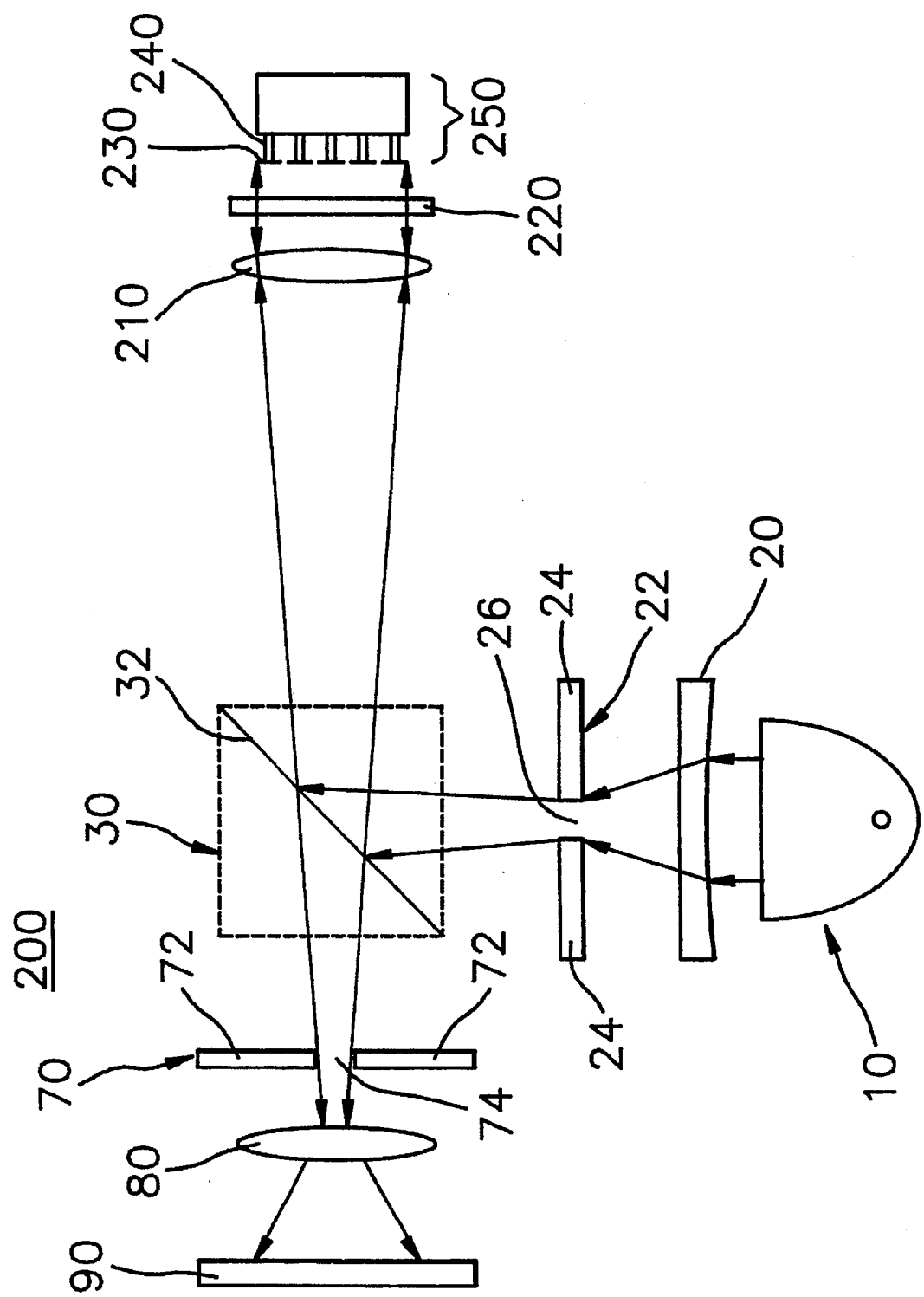
FIG. 2 provides a schematic view of an optical projection system in accordance with the present invention.

In FIG. 2, there is illustrated a schematic view of the inventive optical projection system 200 comprising a light source 10, a source lens 20, a source stopper 22 provided with a light transmitting portion 26 having a predetermined configuration and a light stopping portion 24, a total reflection mirror 30 including a reflective surface 32, a field lens 210, an array of M×N pixel filters 220, an array 250 of M×N actuated mirrors 230, a projection stopper 70 provided with a light transmitting portion 74 having the predetermined configuration and a light stopping portion 72, a projection lens 80 and a projection screen 90.

In such a system, a white light emanating from the light source 10 is focussed along a first optical path onto the light transmitting portion 26 on the source stopper 22 by the source lens 20 located between the light source 10 and the source stopper 22, wherein the white light consists of a first, a second and a third primary light beams, each of the primary light beams being one of the primary colors. The source stopper 22 is used for shaping the white light from the light source 10 via the source lens 20 into the predetermined configuration by allowing a specific portion of the white light to pass through the light transmitting portion 26 thereof. The white light from the source stopper 22 travels onto the reflective surfaces 32 of the total reflection mirror 30. The reflective surface 32 of the total reflection mirror 30 is in a facing relationship with the source stopper 22 and the field lens 210. The white light reflected from the reflective surface 32 of the total reflection mirror 30 travels along a second optical path, and is uniformly illuminated onto the array 250 of M×N actuated mirrors 230. Each of the actuated mirrors 230 in the array 250 includes a pedestal 280, an actuator 240 cantilevered from the pedestal 280 and a mirror 260 formed on top of the actuator 240, wherein each of the actuators 240 is made of a piezoelectric or an electrostrictive material which deforms in response to an electric signal applied thereto and the mirror in each of the actuated mirrors 230 includes a bending portion 290 and an unbending portion 260, the unbending portion 260 referring to a portion of the mirror on top of a portion of the actuator 240 directly cantilevered on the pedestal 280. Each of the actuated mirrors 230 in the array 250 is capable of changing the optical path of each of the primary light beams reflected therefrom in response to the electric signal. Each of the actuated mirrors 230 in the array 250 corresponds to each of the pixels to be displayed on the projection screen 90.

The field lens 210, disposed between the total reflection mirror 30 and the array 250 of M×N actuated mirror 230, collimates the white light reflected from the reflective surface 32 onto the array of M×N pixel filters 220 disposed between the field lens 210 and the array 250 of M×N actuated mirrors 230.

Figure 3A:
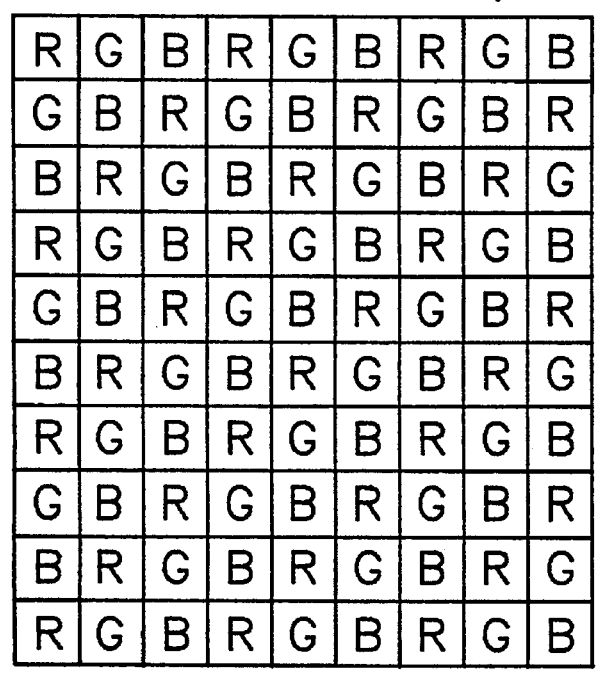
FIG. 3A depicts a plan view of an array of M×N pixel filters in accordance with a first preferred embodiment of the present invention.

Referring to FIG. 3A, there is shown a plan view of the array of M×N pixel filters 220 in accordance with a first preferred embodiment of the present invention. The array of M×N pixel filters 220 includes a plurality of sets of R pixel filter, G pixel filter and B pixel filter, each of the sets being repeated both in a horizontal and a vertical directions. For example, in a group of five pixel filters, consisting of a center pixel filter and four surrounding pixel filters, each of the surrounding pixel filters being located directly above, below, on the left and on the right of the center pixel filter, the center pixel filter and the pixel filters located on the right and the left thereof are of different primary colors, and the pixel filters located above and below the center pixel filter are of the same primary color as the pixel filters located on the left and on the right of the center pixel filter, respectively. Each of the pixel filters is capable of transmitting only one of the primary light beams onto each of the actuated mirrors 230. Each of the pixel filters includes a dichroic coat, made of a dielectric material, e.g., $MgF_2$.

Figure 3B:
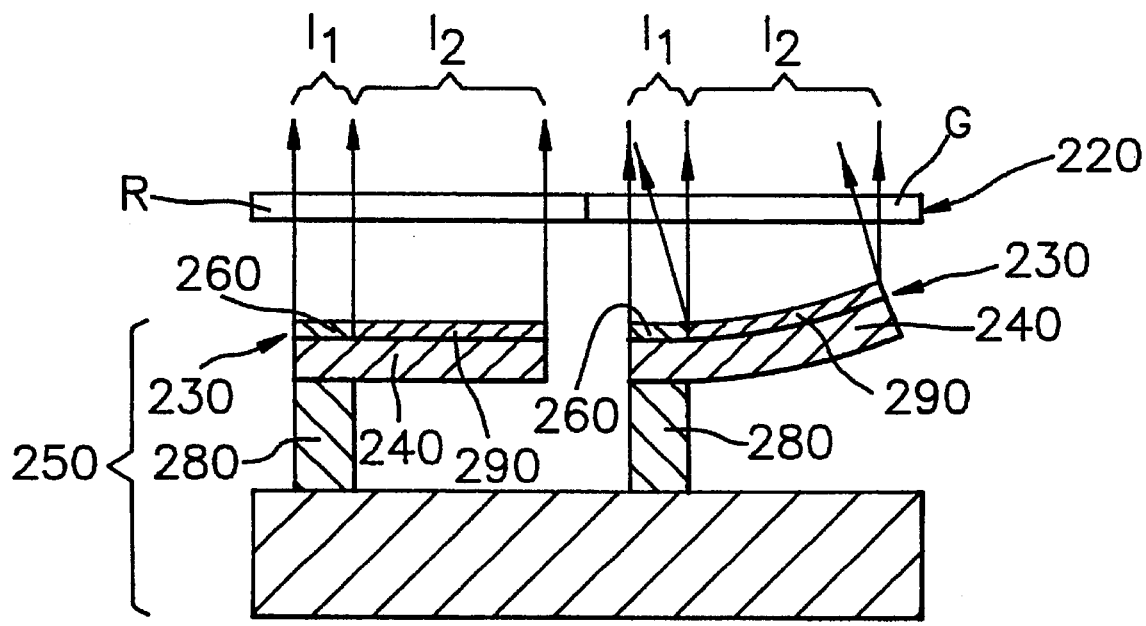
FIG. 3B shows a cross-sectional view of the array of M×N pixel filters and the array of M×N actuated mirrors in accordance with the first preferred embodiment of the present invention.

Each of the actuated mirrors 230 in the array 250, as shown in FIG. 3B, reflects each of the primary beams from the array of M×N pixel filters 220, thereby producing a packet of reflected primary light beams travelling along an optical path, i.e., a third optical path, different from that of the primary light beams from the array of M×N pixel filters 220.

Figure 4A:
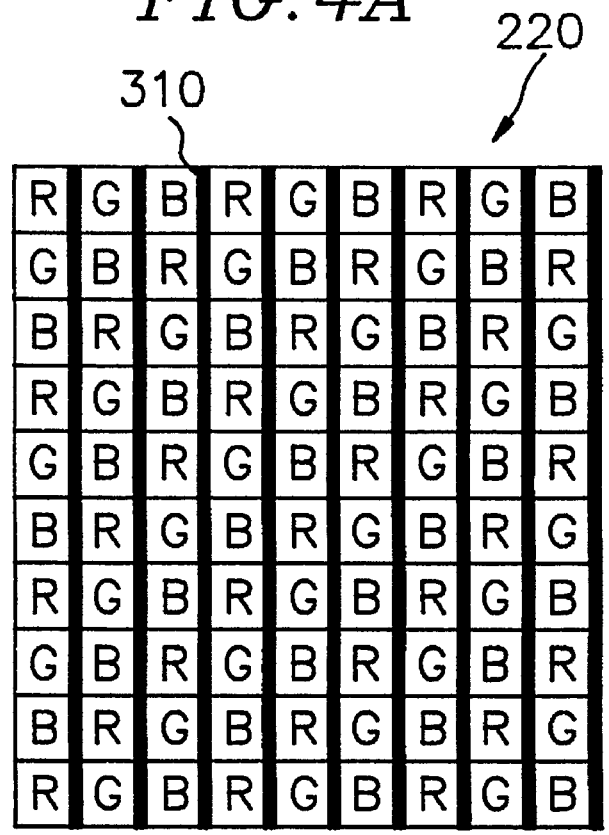
FIG. 4A presents a plan view of an array of M×N pixel filters in accordance with a second preferred embodiment of the present invention.

Alternatively, in FIG. 4A, there is shown a plan view of the array of M×N pixel filters 320 in accordance with a second preferred embodiment of the present invention. The inventive array of M×N pixel filters 320 is similar to the array of M×N pixel filters 220 shown in FIG. 3A except that the array of M×N pixel filters 320 is provided with a black matrix 310 including a plurality of diffusion bands, wherein each of the diffusion bands separates the columns of pixel filters in the array 320. Each of the diffusion bands is made of a light reflective material such as chromium(Cr). It should be noted that each of the diffusion bands in the black matrix 310 must be aligned along the column direction of the array 250 of M×N actuated mirrors 230.

Figure 4B:
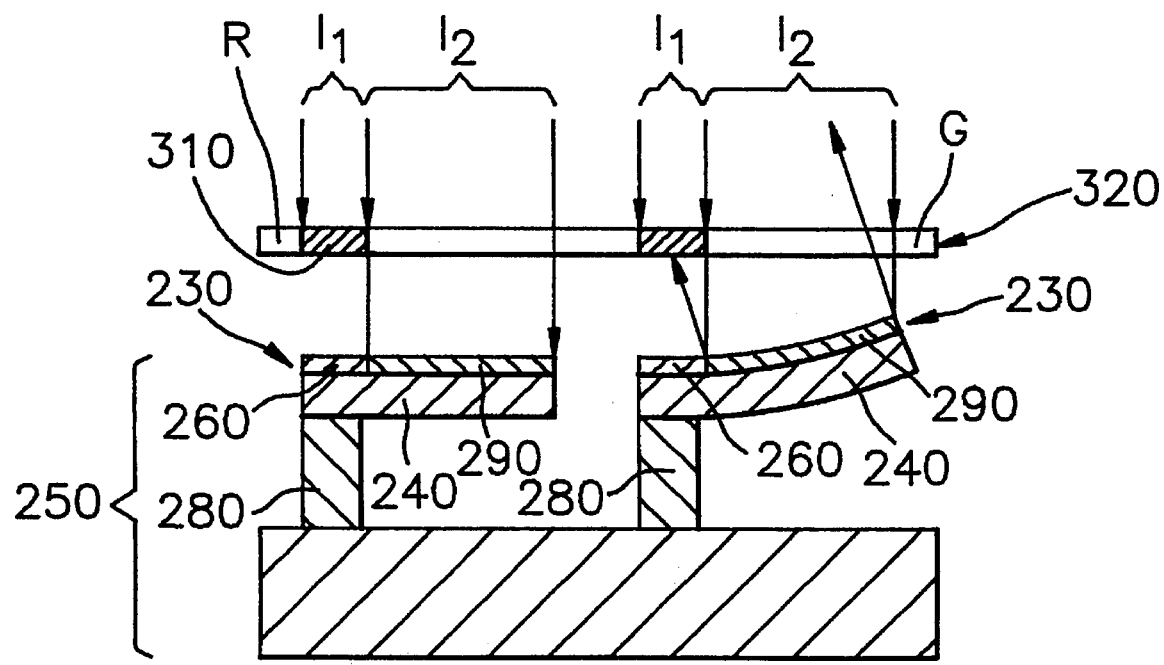
FIG. 4B offers a cross-sectional view of the array of M×N pixel filters and the array of M×N actuated mirrors in accordance with the second preferred embodiment of the present invention.

In FIG. 4B, there is shown a cross-sectional view of the array 250 of M×N actuated mirrors 230 and the array of M×N pixel filters 320 in accordance with the second preferred embodiment of the present invention. Each of the diffusion bands in the black matrix 310 has the same width as the unbending portion 260 in each of the actuated mirrors 230. The notations $I_1$ and $I_2$ in FIGS. 3B and 4B represent a portion of the primary light beam reflected by the unbending portion 260 of the actuated mirror 230 and the remaining portion of the primary light beam reflected by the bending portion 290 of the mirror on the actuated mirror 230 when an electric signal is applied thereto, respectively. When the electric signal is applied to the actuator 240, the portion of the primary light beam $I_1$ reflected by the unbending portion 260 of the mirror might get projected onto the projection screen 90 as a color noise in case of the first preferred embodiment of the present invention, whereas the portion of the light beam $I_1$ shown in FIG. 4B gets disturbed by the diffusion bands of the black matrix 310 in the array of M×N pixel filters 320, eliminating the possibility of occurrence of any color noise in the second embodiment of the present invention. In that sense, the second embodiment can be considered as an improvement over the first embodiment.

The packet of reflected primary light beams is reflected back to the field lens 210 via the array of M×N pixel filters 220. The packet of reflected primary light beams then is focussed by the field lens 210 onto the projection stopper 70. The primary light beams are reflected by the array 250 of M×N actuated mirrors 230 in such a way that the packet of reflected primary light beams focussed by the field lens 210 partially spans onto the light stopping portion 72 of the projection stopper 70, to thereby produce a packet of modulated primary light beams. The packet of modulated primary light beams is projected onto the projection screen 90 via the projection lens 80, to form an image made of the M×N number of pixels thereon.

In comparison with the prior art optical projection system, the inventive optical projection system is of a reduced size and is structurally simple, requiring a less number of components. This is achieved by incorporating therein either the first or the second embodiment, i.e., an array of M×N pixel filters, thereby eliminating the pair of dichroic mirrors, a pair of field lenses and a pair of arrays of actuated mirrors in the prior art optical projection system, reducing the total number of components making up the system, which will, in turn, reduce the length of the optical path the light beam must travel, resulting in an overall size reduction of the system.

While the present invention has been described with respect to certain preferred embodiments only, other modifications and variations may be made without departing from the scope of the present invention as set forth in the following claims.

What is claimed is:

1. An optical projection system capable of displaying an image of M×N pixels, wherein M and N are integers, comprising: a light source for emitting a white light, wherein the white light consists of a first, a second and a third primary light beams, each of the primary light beams being one of the primary colors;

an array of M×N actuated mirrors for changing an optical path of each of the primary light beams reflected therefrom in response to an electric signal, wherein each of the actuated mirrors includes a pedestal, an actuator cantilevered from the pedestal and a mirror formed on top of the actuator, and the mirror in each of the actuated mirrors has a bending portion and an unbending portion, the unbending portion referring to a portion of the mirror on top of a portion of the actuator directly cantilevered on the pedestal, and each of the actuators is made of a piezoelectric or an electrostrictive material which deforms in response to the electric signal applied thereto;

a source stopper, provided with a light transmitting portion having a specific configuration and a light stopping portion and being placed in front of the light source, for shaping the white light from the light source into a predetermined configuration;

a source lens, disposed between the source stopper and the light source, for focussing the white light onto the source stopper;

an optical means for reflecting the white light from the source stopper to the array of M×N actuated mirrors at a predetermined angle;

a field lens located between the optical means and the array of M×N actuated mirrors, wherein the field lens is used for collimating the white light reflected from the optical means onto the array of M×N actuated mirrors and for refocussing each of the primary light beams reflected from each of the actuated mirrors in the array;

an array of M×N pixel filters, disposed between the field lens and the array of M×N actuated mirrors, each of the pixel filters being capable of transmitting only one of the primary light beams, wherein each of the primary light beams transmitted through the array of M×N pixel filters impinges onto a corresponding actuated mirror in the array and each of the primary light beams reflected by each of the actuated mirrors impinges onto the field lens through the array of M×N pixel filters to thereby produce a packet of reflected primary light beams;

a projection screen being placed in front of the array of M×N actuated mirrors for displaying an image made of the M×N number of pixels thereon;

a projection stopper located between the optical means and the projection screen, provided with a light transmitting portion and a light stopping portion for passing a predetermined amount from the packet of reflected primary light beams refocussed by the field lens to thereby produce a packet of modulated primary light beams; and a projection lens for projecting the packet of modulated primary light beams from the projection stopper onto the projection screen.

2. The optical projection system of claim 1, wherein the array of M×N pixel filters includes a plurality of sets of R pixel filter, G pixel filter and B pixel filter, and each of the sets is repeated both in a horizontal and a vertical directions.

3. The optical projection system of claim 1, wherein each of the pixel filters is capable of transmitting only one of the primary light beams.

4. The optical projection system of claim 3, wherein each of the sets is of a perfect square.

5. The optical projection system of claim 3, wherein each of the pixel filters includes a dichroic coating, die coating or pigment coating.

6. The optical projection system of claim 5, the dichroic coating is made of a dielectric material.

7. The optical projection system of claim 2, wherein the array of M×N pixel filters further includes a black matrix having a plurality of diffusion bands, each of the diffusion bands separating the columns of the pixel filters in the array.

8. The optical projection system of claim 7, wherein each of the diffusion bands in the black matrix has the same width as the unbending portion in each of the actuated mirrors.

9. The optical projection system of claim 7, each of the diffusion bands in the black matrix is aligned along the column direction of the array of M×N actuated mirrors.

10. The optical projection system of claim 7, wherein each of the diffusion bands in the black matrix is made of a light reflective material.

11. The optical projection system of claim 10, wherein the light reflective material is chromium.

* * * * *